(12) United States Patent
Djebara

(10) Patent No.: US 11,328,874 B2
(45) Date of Patent: May 10, 2022

(54) SOLID ELECTROLYTIC CAPACITOR

(71) Applicant: AVX Corporation, Fountain Inn, SC (US)

(72) Inventor: Lotfi Djebara, Paris (FR)

(73) Assignee: KYOCERA AVX COMPONENTS CORPORATION, Fountain Inn, SC (US)

( * ) Notice: Subject to any disclaimer, the term of this patent is extended or adjusted under 35 U.S.C. 154(b) by 0 days.

(21) Appl. No.: 16/874,774

(22) Filed: May 15, 2020

(65) Prior Publication Data

US 2020/0365333 A1   Nov. 19, 2020

Related U.S. Application Data

(60) Provisional application No. 62/849,403, filed on May 17, 2019.

(51) Int. Cl.

| | |
|---|---|
| *H01G 9/15* | (2006.01) |
| *H01G 9/048* | (2006.01) |
| *H01G 9/08* | (2006.01) |
| *H01G 9/025* | (2006.01) |
| *H01G 9/012* | (2006.01) |

(Continued)

(52) U.S. Cl.
CPC .............. *H01G 9/15* (2013.01); *H01G 9/012* (2013.01); *H01G 9/025* (2013.01); *H01G 9/048* (2013.01); *H01G 9/052* (2013.01); *H01G 9/08* (2013.01); *H01G 9/042* (2013.01)

(58) Field of Classification Search
CPC ......... H01G 9/052; H01G 9/0525; H01G 9/15
See application file for complete search history.

(56) References Cited

U.S. PATENT DOCUMENTS

| | | | |
|---|---|---|---|
| 3,345,545 A | 10/1967 | Bourgaul et al. | |
| 4,090,231 A * | 5/1978 | Millard | H01G 9/0029 361/529 |

(Continued)

FOREIGN PATENT DOCUMENTS

| | | |
|---|---|---|
| JP | 2001057319 A | 2/2001 |
| JP | 2001217160 A | 8/2001 |

(Continued)

OTHER PUBLICATIONS

Hahn, et al., "Strategies for Manufacturing Ultra Low ESR Ta Capacitors," *CARTS USA 2005*, Mar. 21-24, 2005 (Palm Springs, California), pp. 225-231.

(Continued)

*Primary Examiner* — Eric W Thomas
(74) *Attorney, Agent, or Firm* — Dority & Manning, P.A.

(57) ABSTRACT

A solid electrolytic capacitor comprising a capacitor element is provided. The capacitor element comprises a sintered porous anode body, a dielectric that overlies the anode body, and a solid electrolyte that overlies the dielectric and that includes conductive polymer particles. The anode body has an exterior surface that spans in a longitudinal direction to define a length of the anode body, wherein at least one channel is recessed into the exterior surface of the anode body. The channel is defined by opposing sidewalls that intersect at a base, wherein the channel has a width of from about 0.4 millimeters to about 3 millimeters and a depth of from about 50 micrometers to about 350 micrometers.

24 Claims, 3 Drawing Sheets

(51) Int. Cl.
*H01G 9/052* (2006.01)
*H01G 9/042* (2006.01)

(56) References Cited

U.S. PATENT DOCUMENTS

| | | | |
|---|---|---|---|
| 4,097,916 | A | 6/1978 | Piper |
| 5,457,862 | A | 10/1995 | Sakata et al. |
| 5,473,503 | A | 12/1995 | Sakata et al. |
| 5,729,428 | A | 3/1998 | Sakata et al. |
| 5,812,367 | A | 9/1998 | Kudoh et al. |
| 5,949,639 | A | 9/1999 | Maeda et al. |
| 6,191,936 | B1 | 2/2001 | Webber et al. |
| 6,197,252 | B1 | 3/2001 | Bishop et al. |
| 6,322,912 | B1 | 11/2001 | Fife |
| 6,391,275 | B1 | 5/2002 | Fife |
| 6,416,730 | B1 | 7/2002 | Fife |
| 6,521,668 | B2 | 2/2003 | Anderson et al. |
| 6,527,937 | B2 | 3/2003 | Fife |
| 6,576,099 | B2 | 6/2003 | Kimmel et al. |
| 6,592,740 | B2 | 7/2003 | Fife |
| 6,639,787 | B2 | 10/2003 | Kimmel et al. |
| 6,987,663 | B2 | 1/2006 | Merker et al. |
| 7,116,548 | B2 | 10/2006 | Satterfield, Jr. et al. |
| 7,154,742 | B1 | 12/2006 | Hahn et al. |
| 7,196,457 | B2 | 3/2007 | Miyazawa et al. |
| 7,220,397 | B2 | 5/2007 | Kimmel et al. |
| 7,262,511 | B2 | 8/2007 | Osako et al. |
| 7,341,705 | B2 | 3/2008 | Schnitter |
| 7,342,775 | B2 | 3/2008 | Hahn et al. |
| 7,381,396 | B2 | 6/2008 | Thomas et al. |
| 7,419,926 | B2 | 9/2008 | Schnitter et al. |
| 7,515,396 | B2 | 4/2009 | Biler |
| 7,646,589 | B2 | 1/2010 | Kuriyama |
| 7,929,274 | B2 | 4/2011 | Reed et al. |
| 8,094,434 | B2 | 1/2012 | Rawal et al. |
| 8,125,768 | B2 | 2/2012 | Horacek et al. |
| 8,313,538 | B2 | 11/2012 | Merker et al. |
| 8,576,544 | B2 | 11/2013 | Rawal et al. |
| 8,848,343 | B2 | 9/2014 | Jacobs et al. |
| 8,971,019 | B2 | 3/2015 | Biler |
| 9,218,913 | B2 | 12/2015 | Biler |
| 9,240,285 | B2 | 1/2016 | Djebata et al. |
| 9,324,503 | B2 | 4/2016 | Biler et al. |
| 9,514,888 | B2 | 12/2016 | Merker et al. |
| 9,776,281 | B2 | 10/2017 | Djebara et al. |
| 9,959,979 | B2 | 5/2018 | Hahn et al. |
| 9,959,981 | B2 | 5/2018 | Merker et al. |
| 10,032,566 | B2 | 7/2018 | Matsubara et al. |
| 10,079,115 | B2 | 9/2018 | Djebara et al. |
| 2005/0237698 | A1 | 10/2005 | Postage et al. |
| 2016/0104580 | A1 | 4/2016 | Maeshima et al. |

FOREIGN PATENT DOCUMENTS

| | | |
|---|---|---|
| JP | 2001307957 A | 11/2001 |
| JP | 2003332173 A | 11/2003 |
| JP | 2004247410 A | 9/2004 |
| JP | 2007311531 A | 11/2007 |

OTHER PUBLICATIONS

Joint Industry Standard—IPC/JEDEC J-STD-020E—Moisture/Reflow Sensitivity Classification for Nonhermetic Surface Mount Devices. Dec. 2014, 24 pages.

Knowles—IPC/JEDEC J-STD-020D—Moisture/Reflow Sensitivity Classification for Non-hermetic Solid State Surface Mount Devices, Syfer Surface Mount Capacitor Test Results, AN0024 Issue 3, CN# P109275, 8 pages.

International Search Report and Written Opinion for PCT/US2020/033111 dated Sep. 4, 2020, 11 pages.

* cited by examiner

SOLID ELECTROLYTIC CAPACITOR

CROSS REFERENCE TO RELATED APPLICATION

The present application claims filing benefit of U.S. Provisional Patent Application Ser. No. 62/849,403 having a filing date of May 17, 2019, which is incorporated herein by reference in its entirety.

BACKGROUND OF THE INVENTION

Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte. Intrinsically conductive polymers are often employed as the solid electrolyte due to their advantageous low equivalent series resistance ("ESR") and "non-burning/non-ignition" failure mode. For example, such electrolytes can be formed through in situ chemical polymerization of a 3,4-dioxythiophene monomer ("EDOT") in the presence of a catalyst and dopant. However, conventional capacitors that employ in situ polymerized polymers tend to have a relatively high leakage current ("DCL") and fail at high voltages, such as experienced during a fast switch on or operational current spike. In an attempt to overcome these issues, dispersions have also been employed that are formed from a complex of poly(3,4-ethylenedioxythiophene) and poly(styrene sulfonic acid ("PEDOT:PSS"). While some benefits have been achieved with these capacitors, problems nevertheless remain. For example, when the anode is immersed into the conductive polymer dispersion, gaseous bubbles can form in the polymer layer due to the presence of moisture from the slurry. The gaseous bubbles effectively become trapped within the fully applied polymer layer. Therefore, when they are evaporated during drying, they can actually cause portions of the polymer layer to tear away and leave behind inhomogeneities or "blisters" in the surface that reduce the ability of the layer to adhere to the anode body. Upon exposure to high humidity and/or temperature environments, these blisters can cause the layer to delaminate from the anode body, thereby reducing the degree of electrical contact and resulting in increased leakage current and ESR.

As such, a need exists for an improved solid electrolytic capacitor that can exhibit stable electrical properties.

SUMMARY OF THE INVENTION

In accordance with one embodiment of the present invention, a solid electrolytic capacitor is disclosed that comprises a capacitor element. The capacitor element comprises a sintered porous anode body, a dielectric that overlies the anode body, and a solid electrolyte that overlies the dielectric and that includes conductive polymer particles. The anode body has an exterior surface that spans in a longitudinal direction to define a length of the anode body, wherein at least one channel is recessed into the exterior surface of the anode body. The channel is defined by opposing sidewalls that intersect at a base, wherein the channel has a width of from about 0.4 millimeters to about 3 millimeters and a depth of from about 50 micrometers to about 350 micrometers.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
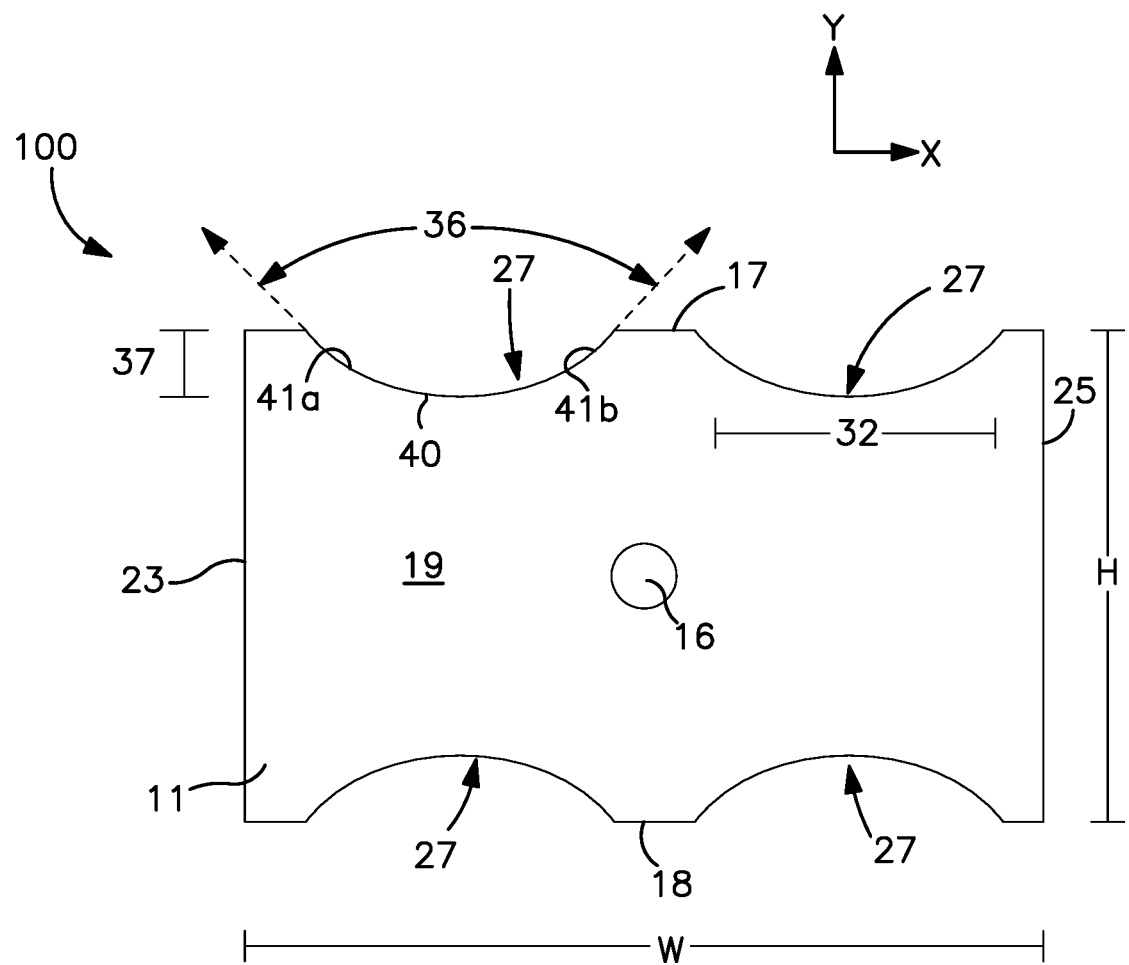
FIG. 1 is a cross-sectional view of the front surface of one embodiment of an anode of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that contains a capacitor element including a sintered porous anode body, a dielectric overlying the anode body, and a solid electrolyte overlying the dielectric that includes conductive polymer particles. Notably, the present inventor has discovered that the topography of the anode body can be selectively controlled to help ensure sufficient draining of the materials (e.g., dispersions) used to form the solid electrolyte, thereby minimizing blistering. More particularly, at least one channel is recessed in an exterior surface of the anode body that is relatively shallow and wide in nature. The channel may, for example, have a width of from about 0.4 to about 3 millimeters, in some embodiments from about 0.5 millimeters to about 3 millimeters, in some embodiments from about 0.8 to about 3 millimeters, in some embodiments from about 1 millimeter to about 2.5 millimeters, in some embodiments from about 1.2 millimeters to about 2 millimeters, and in some embodiments, from about 1.4 millimeters to about 1.8 millimeters, as well as a depth of from about 50 micrometers to about 350 micrometers, in some embodiments from about 60 micrometers to about 300 micrometers, in some embodiments from about 80 micrometers to about 200 micrometers, and in some embodiments, from about 90 micrometer to about 150 micrometers. The channel may also contain spaced apart sidewalls that are oriented at an angle of from about 50° to about 300°, in some embodiments from about 60° to about 300°, in some embodiments from about 80° to about 300°, in some embodiments from about 90° to about 240°, in some embodiments from about 100° to about 200°, and in some embodiments from about 110° to about 140° relative.

As a result of the unique geometry of the anode body, the resulting capacitor may exhibit excellent electrical properties. For example, when subjected to the "Moisture/Reflow Sensitivity Classification for Non-Hermetic Surface Mount Devices" (J-STD-020E, December 2014) test, the resulting capacitor can exhibit a Moisture Sensitive Level of at least 5 (e.g., 5, 4, 3, 2a, 2, or 1), in some cases at least 4 (e.g., 4, 3, 2a, 2, or 1), in some cases at least 3 (e.g., 3, 2a, 2, or 1), in some cases at least 2a (e.g., 2a, 2, or 1), in some cases at least 2 (e.g., 2 or 1), and in some cases equal to 1, according to the following criteria:

| Moisture Sensitive Level | Soak Requirements | | Floor Life | |
|---|---|---|---|---|
| | Time (hours) | Temp/Relative Humidity | Time | Temp/Relative Humidity |
| 1 | 168 | 85° C./85% | Unlimited | ≤30° C./85% |
| 2 | 168 | 85° C./60% | 1 year | ≤30° C./60% |
| 2a | 696 | 30° C./60% | 4 weeks | ≤30° C./60% |
| 3 | 192 | 30° C./60% | 168 hours | ≤30° C./60% |
| 4 | 96 | 30° C./60% | 72 hours | ≤30° C./60% |
| 5 | 72 | 30° C./60% | 48 hours | ≤30° C./60% |

The capacitor can also exhibit other improved electrical properties. For instance, after being subjected to an applied voltage (e.g., 120 volts) for a period of time from about 30 minutes to about 20 hours, in some embodiments from about 1 hour to about 18 hours, and in some embodiments, from about 4 hours to about 16 hours, the capacitor may exhibit a leakage current ("DCL") of only about 100 microamps ("µA") or less, in some embodiments about 70 µA or less, and in some embodiments, from about 1 to about 50 µA. Other electrical properties of the capacitor may also be good and remain stable under various conditions. For example, the capacitor may exhibit a relatively low equivalence series resistance ("ESR"), such as about 200 mohms, in some embodiments less than about 150 mohms, in some embodiments from about 0.01 to about 125 mohms, and in some embodiments, from about 0.1 to about 100 mohms, measured at an operating frequency of 100 kHz and temperature of 23° C. The capacitor may also exhibit a dry capacitance of about 30 nanoFarads per square centimeter ("nF/cm$^2$") or more, in some embodiments about 100 nF/cm$^2$ or more, in some embodiments from about 200 to about 3,000 nF/cm$^2$, and in some embodiments, from about 400 to about 2,000 nF/cm$^2$, measured at a frequency of 120 Hz at temperature of 23° C. Notably, such electrical properties (e.g., ESR, DCL, and/or capacitance) can still remain stable even at high temperatures. For example, the capacitor may exhibit an ESR, DCL, and/or capacitance value within the ranges noted above even after being exposed to a temperature of from about 80° C. or more, in some embodiments from about 100° C. to about 150° C., and in some embodiments, from about 105° C. to about 130° C. (e.g., 105° C. or 125° C.) for a substantial period of time, such as for about 100 hours or more, in some embodiments from about 150 hours to about 3000 hours, and in some embodiments, from about 200 hours to about 2500 hours (e.g., 240 hours). In one embodiment, for example, the ratio of the ESR and/or capacitance value of the capacitor after being exposed to the high temperature (e.g., 125° C.) for 240 hours to the initial ESR, DCL, and/or capacitance value of the capacitor (e.g., at 23° C.) is about 2.0 or less, in some embodiments about 1.5 or less, and in some embodiments, from 1.0 to about 1.3.

Further, the capacitor may exhibit a high percentage of its wet capacitance, which enables it to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

The capacitor may exhibit a wet-to-dry capacitance percentage of about 50% or more, in some embodiments about 60% or more, in some embodiments about 70% or more, and in some embodiments, from about 80% to about 100%.

It is also believed that the dissipation factor of the capacitor may be maintained at relatively low levels. The dissipation factor generally refers to losses that occur in the capacitor and is usually expressed as a percentage of the ideal capacitor performance. For example, the dissipation factor of the capacitor is typically about 250% or less, in some embodiments about 200% or less, and in some embodiments, from about 1% to about 180%, as determined at a frequency of 120 Hz. The capacitor may also be able to be employed in high voltage applications, such as at rated voltages of about 35 volts or more, in some embodiments about 50 volts or more, and in some embodiments, from about 60 volts to about 200 volts. The capacitor may, for example, exhibit a relatively high "breakdown voltage" (voltage at which the capacitor fails), such as about 60 volts or more, in some embodiments about 70 volts or more, in some embodiments about 80 volts or more, and in some embodiments, from about 100 volts to about 300 volts. Likewise, the capacitor may also be able to withstand relatively high surge currents, which is also common in high voltage applications. The peak surge current may be, for example, about 100 Amps or more, in some embodiments about 200 Amps or more, and in some embodiments, from about 300 Amps to about 800 Amps.

Various embodiments of the capacitor will now be described in more detail.

I. Capacitor Element

A. Anode Body

The capacitor element includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluotantalate ($K_2TaF_7$), sodium fluotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The specific charge of the powder typically varies from about 2,000 to about 800,000 microFarads*Volts per gram ("µF*V/g") depending on the desired application. As is known in the art, the specific charge may be determined by multiplying capacitance by the anodizing voltage employed, and then dividing this product by the weight of the anodized electrode body. For instance, a low charge powder may be employed that has a specific charge of from about 2,000 to about 70,000 µF*V/g, in some embodiments from about 5,000 to about 60,000 µF*V/g, and in some embodiments, from about 10,000 to about 50,000 µF*V/g. Of course, high specific charge powders may also be employed, such as those having a specific charge of from about 70,000 to about 800,000 µF*V/g, in some embodiments from about 80,000 to about 700,000 µF*V/g, and in some embodiments, from about 100,000 to about 600,000 µF*V/g.

The powder may be a free-flowing, finely divided powder that contains primary particles. The primary particles of the powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead to the anode body may also be accomplished using other known techniques, such as by welding the lead to the body or embedding it within the anode body during formation (e.g., prior to compaction and/or sintering).

If desired, the channel(s) of the present invention may be formed during pressing as would be known to those skilled in the art. For example, the press mold may contain a series of protrusions that correspond to the desired shape of the channels. In this manner, the powder is compressed around the protrusions so that when removed from the mold, the resulting anode body contains channels at those areas where the protrusions were located in the mold. The resulting anode may have a series of channels along at least one exterior surface. However, it is to be understood that it is not required that the channels are formed during pressing. For example, the channels may instead be formed by any other suitable technique after pressing of the anode powder.

After compaction, the resulting anode body may be diced into any desired shape, such as a square, rectangle, circle, oval, triangle, hexagon, octagon, heptagon, pentagon, etc. The anode body may then be subjected to a heating step in which most, if not all, of any binder/lubricant are removed. For example, binder may be removed by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1600° C., in some embodiments from about 800° C. to about 1500° C., and in some embodiments, from about 900° C. to about 1200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Figure 2:
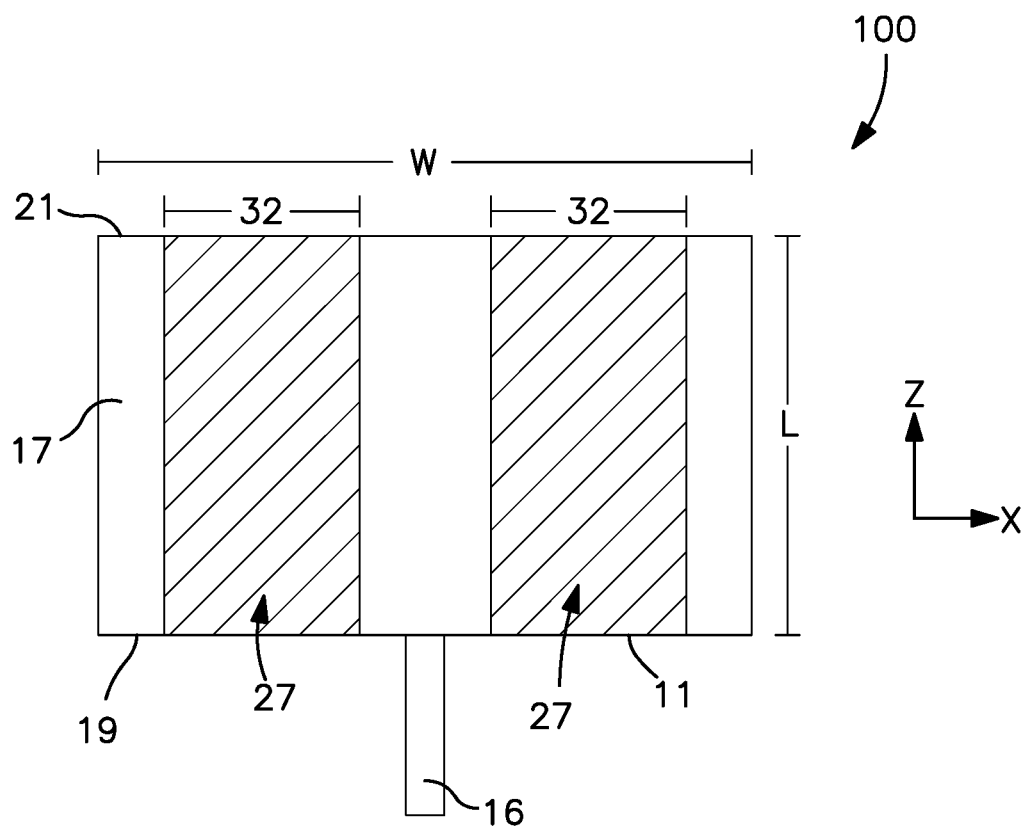
FIG. 2 is a top view of the anode of FIG. 1.

Upon sintering, a longitudinally extending channel is formed in at least one exterior surface of the anode body. Referring to FIGS. 1-2, for example, one embodiment of an anode 100 is shown that contains a porous, sintered anode body 11 having a first exterior side surface 23 and a second exterior side surface 25 positioned between a front exterior surface 19 and a rear exterior surface 21. The anode body 11 is also defined by an upper exterior surface 17 and a lower exterior surface 18. The cross-sectional shape of the front surface 19 and/or the rear surface 21 may generally vary based on the desired shape of the anode body 11. In this particular embodiment, for example, both front surface 19 and rear surface 21 have a rectangular cross-sectional shape such that the anode body 11 is rectangular. Other suitable shapes may include, for instance, square, triangular, hexagonal, octagonal, heptagonal, pentagonal, trapezoidal, elliptical, star, sinusoidal, etc. The anode body 11 also has a length "L" in the longitudinal z-direction, and a width "W" in the x-direction and height "H" in the y-direction. The length L of the anode body 11 may range from about 0.25 millimeters to about 40 millimeters, in some embodiments from about 0.5 millimeters to about 20 millimeters, in some embodiments from about 0.75 millimeters to about 10 millimeters, and in some embodiments from about 1 millimeter to about 5 millimeters. The width W of the anode body 11 may range from about 0.5 millimeters to about 50 millimeters, in some embodiments from about 0.75 millimeters to about 25 millimeters, in some embodiments from about 1 millimeter to about 20 millimeters, and in some embodiments from about 1.25 millimeters to about 10 millimeters. Likewise, the height H of the anode body 11 may, for example, range from about 0.25 millimeters to about 20 millimeters, in some embodiments from about 0.5 millimeters to about 15 millimeters, in some embodiments from about 0.75 millimeters to about 10 millimeters, and in some embodiments from about 1 millimeter to about 5 millimeters.

Regardless of its particular size or shape, the anode body 11 contains one or more channels 27 that are recessed into an exterior surface of the anode body 11, such as the upper surface 17 and/or lower surface 18. The channels 27 may be "longitudinally extending" in the sense that they possess a length L in the longitudinal z-direction of the anode body 11, as shown in FIG. 2. While the channels 27 are substantially parallel with the longitudinal z-direction, this is by no means a requirement. The channels 27 shown in FIG. 2 also extend along the entire length of the anode body 11 and intersect both the front surface 19 and the rear surface 21. It should be understood, however, that one or more of the plurality of channels may also extend along only a portion of the anode body length so that they intersect only one end of the anode body, or so that they do not intersect either end.

The total number of channels in the anode body may vary, such as from about 1 to about 10, in some embodiments from about 1 to about 8, in some embodiments from about 2 to about 6, and in some embodiments, from about 2 to about 5 (e.g., 4). When present on multiple exterior surfaces (e.g., upper surface and lower surface), the number of channels on each surface may be the same or different, and typically varies from about from 1 to 5, in some embodiments from 1 to 4, and in some embodiments, from 1 to 3 (e.g., 2). It is generally desired that the plurality of channels are distributed symmetrically and equidistant from each other, although this is by no means a requirement. In FIGS. 1-2, for example, the depicted anode body 11 contains a first set of channels 27 recessed in the upper surface 17 and a second set of channels 27 recessed in the lower surface 18. As shown, the channels 27 are symmetrical in the sense that a channel on the lower surface opposes a channel on the upper surface. The channels 27 are also generally defined by spaced apart, opposing sidewalls 41a and 41b that intersect at a base 40. If desired, the channels 27 in the upper surface 17 of the anode body 11 may have a base 40 that is generally flat and/or parallel to the upper surface 17, and likewise the channels 27 in the lower surface 18 of the anode body 11 may have a base 40 that is generally flat and/or parallel to the lower surface 18.

As indicated above, the channels of the present invention are generally shallow and wide to help ensure sufficient drainage of the conductive polymer and inhibit polymer bridging and blistering. Referring to FIGS. 1-2, for instance, the channels 27 may have a width 32 that can range from about 0.8 millimeters to about 3 millimeters, in some embodiments from about 1 millimeter to about 2.5 millimeters, in some embodiments from about 1.2 millimeters to about 2 millimeters, and in some embodiments, from about 1.4 millimeters to about 1.8 millimeters. The channels 27 may also have a depth 37, as measured from the upper surface 17 and/or lower surface 18, which can range from about 50 micrometers to about 350 micrometers, in some embodiments from about 60 micrometers to about 300 micrometers, in some embodiments from about 80 micrometers to about 200 micrometers, and in some embodiments, from about 90 micrometer to about 150 micrometers.

Although FIGS. 1-2 show an anode or capacitor element where the channels 27 generally have the same width 32 and depth 37, this is by no means required, and it is possible that one or more of the channels may have a different width and/or depth. The shallow nature of the channels may also be characterized by the angle that is defined between the sidewalls. Referring again to FIG. 1, for instance, an angle 36 may be formed between the sidewalls 41a and 41b that is relatively large. For example, the angle 36 may be from about 80° to about 300°, in some embodiments from about 90° to about 240°, in some embodiments from about 100° to about 200°, and in some embodiments from about 110° to about 140°.

B. Dielectric

The anode body may also be coated with a dielectric. As indicated above, the dielectric is formed by anodically oxidizing ("anodizing") the sintered anode so that a dielectric layer is formed over and/or within the anode. For example, a tantalum (Ta) anode may be anodized to tantalum pentoxide ($Ta_2O_5$).

Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); glycols (e.g., ethylene glycol, propylene glycol, etc.); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent(s) may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, an ionic compound is generally employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

To form the dielectric, a current is typically passed through the electrolyte while it is in contact with the anode body. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150 V. During oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process may be employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. In one particular embodiment, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an ionic compound that is an acid, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage may likewise contain an ionic compound that is a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

A solid electrolyte overlies the dielectric and generally functions as the cathode for the capacitor. The solid electrolyte generally includes a conductive polymer, such as a polypyrrole, polythiophene, polyaniline, and so forth. Thiophene polymers are particularly suitable for use in the solid electrolyte. In certain embodiments, for instance, an "extrinsically" conductive thiophene polymer may be employed in the solid electrolyte that has repeating units of the following formula (I):

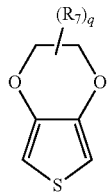

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

The polymers of formula (I) are generally considered to be "extrinsically" conductive to the extent that they typically require the presence of a separate counterion that is not covalently bound to the polymer. The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid); tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

Intrinsically conductive polymers may also be employed that have a positive charge located on the main chain that is at least partially compensated by anions covalently bound to the polymer. For example, one example of a suitable intrinsically conductive thiophene polymer may have repeating units of the following formula (II):

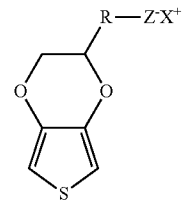

wherein,

R is $(CH_2)_a$—O—$(CH_2)_b$—L, where L is a bond or $HC([CH_2]_cH)$;

a is from 0 to 10, in some embodiments from 0 to 6, and in some embodiments, from 1 to 4 (e.g., 1);

b is from 1 to 18, in some embodiments from 1 to 10, and in some embodiments, from 2 to 6 (e.g., 2, 3, 4, or 5);

c is from 0 to 10, in some embodiments from 0 to 6, and in some embodiments, from 1 to 4 (e.g., 1);

Z is an anion, such as $SO_3^-$, $C(O)O^-$; $BF_4^-$, $CF_3SO_3^-$, $SbF_6^-$, $N(SO_2CF_3)_2^-$, $C_4H_3O_4^-$, $ClO_4^-$, etc.;

X is a cation, such as hydrogen, an alkali metal (e.g., lithium, sodium, rubidium, cesium or potassium), ammonium, etc.

In one particular embodiment, Z in formula (II) is a sulfonate ion such that the intrinsically conductive polymer contains repeating units of the following formula (III):

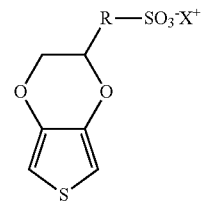

wherein, R and X are defined above. In formula (II) or (III), a is preferably 1 and b is preferably 3 or 4. Likewise, X is preferably sodium or potassium.

If desired, the polymer may be a copolymer that contains other types of repeating units. In such embodiments, the repeating units of formula (II) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (II). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)-1-propanesulphonic acid, salt).

The conductive polymer is typically applied in the form of pre-polymerized particles. One benefit of employing such particles is that they can minimize the presence of ionic species (e.g., $Fe^{2+}$ or $Fe^{3+}$) produced during conventional in situ polymerization processes, which can cause dielectric breakdown under high electric field due to ionic migration. Thus, by applying the conductive polymer as pre-polymerized particles rather through in situ polymerization, the resulting capacitor may exhibit a relatively high "breakdown voltage." If desired, the solid electrolyte may be formed from one or multiple layers. When multiple layers are employed, it is possible that one or more of the layers includes a conductive polymer formed by in situ polymerization. However, when it is desired to achieve very high breakdown voltages, the solid electrolyte may desirably be formed primarily from the conductive particles described above, such that it is generally free of conductive polymers formed via in situ polymerization. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

When employed, the conductive polymer particles typically have an average size (e.g., diameter) of from about 1 to about 80 nanometers, in some embodiments from about 2 to about 70 nanometers, and in some embodiments, from about 3 to about 60 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

Although not necessarily required, the conductive polymer particles may be applied in the form of a dispersion. The concentration of the conductive polymer in the dispersion may vary depending on the desired viscosity of the dispersion and the particular manner in which the dispersion is to be applied to the capacitor element. Typically, however, the polymer constitutes from about 0.1 to about 10 wt. %, in some embodiments from about 0.4 to about 5 wt. %, and in some embodiments, from about 0.5 to about 4 wt. % of the dispersion. The dispersion may also contain one or more components to enhance the overall properties of the resulting solid electrolyte. For example, the dispersion may contain a binder to further enhance the adhesive nature of the polymeric layer and also increase the stability of the particles within the dispersion. The binder may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or crosslinkable polymers, such as polyurethanes, polyacrylates or polyolefins, and subsequent crosslinking. Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers. Surface-active substances may also be employed in the dispersion, such as ionic or nonionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas.

i. Inner Layers

The solid electrolyte is generally formed from one or more "inner" conductive polymer layers. The term "inner" in this context refers to one or more layers that overly the dielectric, whether directly or via another layer (e.g., precoat layer). One or multiple inner layers may be employed. For example, the solid electrolyte typically contains from 2 to 30, in some embodiments from 4 to 20, and in some embodiments, from about 5 to 15 inner layers (e.g., 10 layers). The inner layer(s) may, for example, contain intrinsically and/or extrinsically conductive polymer particles such as described above. For instance, such particles may constitute about 50 wt. % or more, in some embodiments about 70 wt. % or more, and in some embodiments, about 90 wt. % or more (e.g., 100 wt. %) of the inner layer(s). In alternative embodiments, the inner layer(s) may contain an in-situ polymerized conductive polymer. In such embodiments, the in-situ polymerized polymers may constitute about 50 wt. % or more, in some embodiments about 70 wt. % or more, and in some embodiments, about 90 wt. % or more (e.g., 100 wt. %) of the inner layer(s).

ii. Outer Layers

The solid electrolyte may also contain one or more optional "outer" conductive polymer layers that overly the inner layer(s) and are formed from a different material. For example, the outer layer(s) may contain extrinsically conductive polymer particles. In one particular embodiment, the outer layer(s) are formed primarily from such extrinsically conductive polymer particles in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers, each of which may optionally be formed from a dispersion of the extrinsically conductive polymer particles.

D. External Polymer Coating

An external polymer coating may also overly the solid electrolyte. The external polymer coating may contain one or more layers formed from pre-polymerized conductive polymer particles such as described above (e.g., dispersion of extrinsically conductive polymer particles). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 80 to about 500 nanometers, in some embodiments from about 90 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

E. Cathode Coating

If desired, the capacitor element may also employ a cathode coating that overlies the solid electrolyte and other optional layers (e.g., external polymer coating). The cathode coating may contain a metal particle layer includes a plurality of conductive metal particles dispersed within a polymer matrix. The particles typically constitute from about 50 wt. % to about 99 wt. %, in some embodiments from about 60 wt. % to about 98 wt. %, and in some embodiments, from about 70 wt. % to about 95 wt. % of the layer, while the polymer matrix typically constitutes from about 1 wt. % to about 50 wt. %, in some embodiments from about 2 wt. % to about 40 wt. %, and in some embodiments, from about 5 wt. % to about 30 wt. % of the layer.

The conductive metal particles may be formed from a variety of different metals, such as copper, nickel, silver, nickel, zinc, tin, lead, copper, aluminum, molybdenum, titanium, iron, zirconium, magnesium, etc., as well as alloys thereof. Silver is a particularly suitable conductive metal for use in the layer. The metal particles often have a relatively small size, such as an average size of from about 0.01 to about 50 micrometers, in some embodiments from about 0.1 to about 40 micrometers, and in some embodiments, from about 1 to about 30 micrometers. Typically, only one metal particle layer is employed, although it should be understood that multiple layers may be employed if so desired. The total thickness of such layer(s) is typically within the range of from about 1 μm to about 500 μm, in some embodiments from about 5 μm to about 200 μm, and in some embodiments, from about 10 μm to about 100 μm.

The polymer matrix typically includes a polymer, which may be thermoplastic or thermosetting in nature. Typically, however, the polymer is selected so that it can act as a barrier to electromigration of silver ions, and also so that it contains a relatively small amount of polar groups to minimize the degree of water adsorption in the cathode coating. In this regard, vinyl acetal polymers may be particularly suitable for this purpose, such as polyvinyl butyral, polyvinyl formal, etc. Polyvinyl butyral, for instance, may be formed by reacting polyvinyl alcohol with an aldehyde (e.g., butyraldehyde). Because this reaction is not typically complete, polyvinyl butyral will generally have a residual hydroxyl content. By minimizing this content, however, the polymer can possess a lesser degree of strong polar groups, which would otherwise result in a high degree of moisture adsorption and result in silver ion migration. For instance, the residual hydroxyl content in polyvinyl acetal may be about 35 mol. % or less, in some embodiments about 30 mol. % or less, and in some embodiments, from about 10 mol. % to about 25 mol. %. One commercially available example of such a polymer is available from Sekisui Chemical Co., Ltd. under the designation "BH-S" (polyvinyl butyral).

To form the cathode coating, a conductive paste is typically applied to the capacitor that overlies the solid electrolyte. One or more organic solvents are generally employed in the paste. A variety of different organic solvents may generally be employed, such as glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., benzyl alcohol, methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); etc., as well as mixtures thereof. The organic solvent(s) typically constitute from about 10 wt. % to about 70 wt. %, in some embodiments from about 20 wt. % to about 65 wt. %, and in some embodiments, from about 30 wt. % to about 60 wt. %. of the paste. Typically, the metal particles constitute from about 10 wt. % to about 60 wt. %, in some embodiments from about 20 wt. % to about 45 wt. %, and in some embodiments, from about 25 wt. % to about 40 wt. % of the paste, and the resinous matrix constitutes from about 0.1 wt. % to about 20 wt. %, in some embodiments from about 0.2 wt. % to about 10 wt. %, and in some embodiments, from about 0.5 wt. % to about 8 wt. % of the paste.

The paste may have a relatively low viscosity, allowing it to be readily handled and applied to a capacitor element. The viscosity may, for instance, range from about 50 to about 3,000 centipoise, in some embodiments from about 100 to about 2,000 centipoise, and in some embodiments, from about 200 to about 1,000 centipoise, such as measured with a Brookfield DV-1 viscometer (cone and plate) operating at a speed of 10 rpm and a temperature of 25° C. If desired, thickeners or other viscosity modifiers may be employed in the paste to increase or decrease viscosity. Further, the thickness of the applied paste may also be relatively thin and still achieve the desired properties. For example, the thickness of the paste may be from about 0.01 to about 50 micrometers, in some embodiments from about 0.5 to about 30 micrometers, and in some embodiments, from about 1 to about 25 micrometers. Once applied, the metal paste may be optionally dried to remove certain components, such as the organic solvents. For instance, drying may occur at a temperature of from about 20° C. to about 150° C., in some embodiments from about 50° C. to about 140° C., and in some embodiments, from about 80° C. to about 130° C.

F. Other Components

If desired, the capacitor may also contain other layers as is known in the art. In certain embodiments, for instance, a carbon layer (e.g., graphite) may be positioned between the solid electrolyte and the silver layer that can help further limit contact of the silver layer with the solid electrolyte. In addition, a pre-coat layer may also be employed that overlies the dielectric and includes an organometallic compound, such as described in more detail below.

II. Terminations

Once the layers of the capacitor element are formed, the resulting capacitor may be provided with terminations. For example, the capacitor may contain an anode termination to which an anode lead of the capacitor element is electrically connected and a cathode termination to which the cathode of the capacitor is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor element using any technique known in the art. In one embodiment, for example, a lead frame may be provided that defines the cathode termination and anode termination. To attach the electrolytic capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and compound (e.g., silane compounds). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor element is adequately adhered to the cathode termination.

Figure 3:
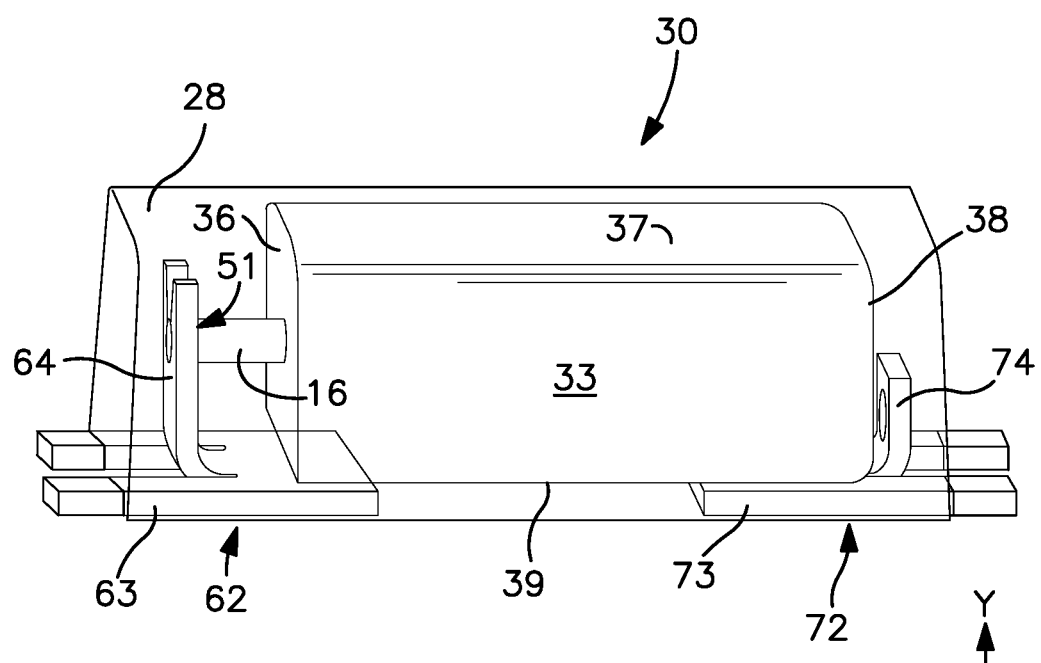
FIG. 3 is a perspective view of one embodiment of the capacitor of the present invention.

Referring to FIG. 3, for example, the electrolytic capacitor 30 is shown as including an anode termination 62 and a cathode termination 72 in electrical connection with the capacitor element 33 having an upper surface 37, lower surface 39, rear surface 38, and front surface 36. Although not expressly shown in FIG. 3, it should be understood that the topography of the capacitor element may correspond to the topography of the anode body as discussed above.

Namely, the capacitor element may also contain channels in one or more of its exterior surfaces (e.g., upper surface 37 and/or lower surface 39).

The cathode termination 72 in the illustrated embodiment is in electrical contact with the lower surface 39 via a conductive adhesive. More specifically, the cathode termination 72 contains a first component 73 that is in electrical contact and generally parallel with the lower surface 39 of the capacitor element 33. The cathode termination 72 may also contain a second component 74 that is substantially perpendicular to the first component 73 and in electrical contract with the rear surface 38 of the capacitor element 33. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. Although not depicted in FIG. 3, the region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, the conductive adhesive may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 is initially bent upward to the position shown in FIG. 3. Thereafter, the capacitor element 33 is positioned on the cathode termination 72 so that its lower surface 39 contacts the adhesive and the anode lead 16 is received by the region 51. If desired, an insulating material (not shown), such as a plastic pad or tape, may be positioned between the lower surface 39 of the capacitor element 33 and the first component 63 of the anode termination 62 to electrically isolate the anode and cathode terminations. The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

III. Housing

Due to the ability of the capacitor to exhibit good electrical performance in various environments, it is not necessary for the capacitor element to be hermetically sealed within a housing. Nevertheless, in certain embodiments, it may be desired to hermetically seal the capacitor element within a housing. The capacitor element may be sealed within a housing in various ways. In certain embodiments, for instance, the capacitor element may be enclosed within a case, which may then be filled with a resinous material, such as a thermoset resin (e.g., epoxy resin) that can be cured to form a hardened housing. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof. Regardless, the resinous material may surround and encapsulate the capacitor element so that at least a portion of the anode and cathode terminations are exposed for mounting onto a circuit board. When encapsulated in this manner, the capacitor element and resinous material form an integral capacitor. As shown in FIG. 1, for instance, the capacitor element 33 is encapsulated within a housing 28 so that a portion of the anode termination 62 and a portion of the cathode termination 72 are exposed.

Of course, in alternative embodiments, it may be desirable to enclose the capacitor element within a housing that remains separate and distinct. In this manner, the atmosphere of the housing may be gaseous and contain at least one inert gas, such as nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing. Any of a variety of different materials may be used to form the separate housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof. The housing may have any desired shape, such as cylindrical, D-shaped, rectangular, triangular, prismatic, etc.

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Dissipation Factor

The dissipation factor may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature may be 23° C.± 2° C.

Leakage Current

Leakage current may be measured using a leakage test meter at a temperature of 23° C.±2° C. and at the rated voltage after a minimum of 60 seconds.

Sensitivity Level (MSL) Testing

MSL may be tested according to IPC/JEDEC J-STD 020E (December 2014) to Level 4 and 3 with reflow for Pb-free assembly. Reflow peak temperature (Tp) may be 260° C. Visual evaluation of cracks may be measured with 40 times magnification.

EXAMPLE 1

40,000 pFV/g tantalum powder was used to form anode samples. Each anode sample was embedded with a tantalum wire, pressed to a density of 5.6 g/cm³ and sintered at 1380° C. The resulting pellets had a size of 5.20×3.60×0.80 mm with flat sides. The pellets were anodized to 76.0 volts in water/phosphoric acid electrolyte with a conductivity of 8.6 mS at a temperature of 40° C. to form the dielectric layer. The pellets were anodized again to 130 volts in a water/boric acid/disodium tetraborate with a conductivity of 2.0 mS at a temperature of 30° C. for 10 seconds to form a thicker oxide layer built up on the outside. Upon anodization, four pre-coat layers of organometallic compound were used that contained a solution of (3-aminopropyl)trimethoxysilane in ethanol (1.0%). A conductive polymer coating was formed by dipping the anodes into a solution of poly(4-(2,3-dihydrothieno-[3,4-b][1,4]dioxin-2-ylmethoxy)-1-butane-sulphonic acid having a solids content of 2.0% (Clevios™ K, Heraeus). Upon coating, the parts were dried at 125° C. for 15 minutes. Thereafter, the parts were dipped into a dispersed poly(3,4-ethylenedioxythiophene) having a solids content 1.1% and viscosity 20 mPa·s (Clevios™ K, Heraeus). Upon coating, the parts were dried at 125° C. for 15 minutes. This process was repeated 8 times. Thereafter, the parts were dipped into a dispersed poly(3,4-ethylenedioxythiophene) having a solids content 2.0% and viscosity 20 mPa·s (Clevios™ K, Heraeus). Upon coating, the parts were dried at 125° C. for 15 minutes. This process was repeated 3 times. Thereafter, the parts were dipped into a dispersed poly(3,4-ethylenedioxythiophene) having a solids content of 2% and viscosity 160 mPa·s (Clevios™ K, Heraeus). Upon coating, the parts were dried at 125° C. for 15 minutes. This process was repeated 14 times. The parts were then dipped into a graphite dispersion and dried. Finally, the parts were dipped into a silver dispersion and dried. Multiple parts (6000) of 47 µF/35V capacitors were made in this manner and encapsulated in a silica resin.

EXAMPLE 2

Capacitors were formed in the manner described in Example 1, except that a different pellet surface shape was formed. The anode pellet contained two channels on each side with the largest area as described herein and shown in FIGS. 1-2. The width of each channel was approximately 0.55 mm and the depth was approximately 120 micrometers. The direction of each channel was in parallel with the longitudinal direction of the anode pellet. The angle of the sidewalls of each channel was 65°. Multiple parts (3000) of 47 µF/35V capacitors were made in this manner and encapsulated in a silica resin.

Moisture sensitivity level was tested for each sample after 96 hours (MSL4) and 192 hours (MSL3) according to IPC/JEDEC J-STD 020E (December 2014). The ratio of the cracked parts is set forth below in Table 1. The sample size was 50 units minimum for each humidification time.

TABLE 1

| MSL Testing - Failed Parts Ratio | | |
|---|---|---|
| | Crack Fail Ratio (%) | |
| | 96 hrs 30° C./60% RH | 192 hrs 30° C./60% RH |
| Example 1 | 10 | 42 |
| Example 2 | 1.3 | 8 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising a capacitor element that comprises:
   a sintered porous anode body having an exterior surface that spans in a longitudinal direction to define a length of the anode body, wherein at least one channel is recessed into the exterior surface of the anode body, the at least one channel being defined by opposing sidewalls that intersect at a base, wherein the at least one channel has a width of from about 0.4 millimeters to about 3 millimeters and a depth of from about 50 micrometers to about 350 micrometers;
   a dielectric that overlies the anode body; and
   a solid electrolyte that overlies the dielectric and that includes conductive polymer particles.

2. The solid electrolytic capacitor of claim 1, wherein the base is generally parallel to the exterior surface of the anode body.

3. The solid electrolytic capacitor of claim 1, wherein an angle is formed between the sidewalls that is from about 50° to about 300°.

4. The solid electrolytic capacitor of claim 1, wherein the at least one channel extends in the longitudinal direction.

5. The solid electrolytic capacitor of claim 4, wherein the at least one channel extends the entire length of the anode body.

6. The solid electrolytic capacitor of claim 1, wherein the anode body defines an upper exterior surface and an opposing lower exterior surface, a rear exterior surface and an opposing front surface, and opposing side surfaces, wherein the at least one channel is recessed into the upper exterior surface or the lower exterior surface.

7. The solid electrolytic capacitor of claim 6, wherein an anode lead extends from the front exterior surface of the anode body.

8. The solid electrolytic capacitor of claim 1, wherein the anode body defines an upper exterior surface and an opposing lower exterior surface, where the at least one channel comprises a first channel and a second channel wherein the first channel is recessed in the upper exterior surface of the anode body that is defined by opposing sidewalls intersecting at a base, and further wherein the second channel is formed in the lower exterior surface of the anode body that is defined by opposing sidewalls intersecting at a base, wherein the first channel and the second channel have a width of from about 0.4 millimeters to about 3 millimeters and depth of from about 50 micrometers to about 350 micrometers.

9. The solid electrolytic capacitor of claim 8, wherein the first channel opposes the second channel.

10. The solid electrolytic capacitor of claim 8, wherein an angle is formed between the sidewalls of the first channel that is from about 60° to about 300°.

11. The solid electrolytic capacitor of claim 8, wherein an angle is formed between the sidewalls of the second channel that is from about 60° to about 300°.

12. The solid electrolytic capacitor of claim 8, wherein the first channel and the second channel extend in the longitudinal direction.

13. The solid electrolytic capacitor of claim 12, wherein the first channel and the second channel extend the entire length of the anode body.

14. The solid electrolytic capacitor of claim 8, wherein the at least one channel comprises from 1 to 4 channels recessed in the upper exterior surface and from 1 to 4 channels recessed in the lower exterior surface.

15. The solid electrolytic capacitor of claim 1, wherein the capacitor exhibits a Moisture Sensitive Level of at least 4 when tested in accordance with J-STD-020E (December 2014).

16. The solid electrolytic capacitor of claim 1, further comprising an anode termination that is in electrical contact with the anode body and a cathode termination that is in electrical connection with the solid electrolyte.

17. The solid electrolytic capacitor of claim 1, further comprising a housing within which the capacitor element is enclosed.

18. The solid electrolytic capacitor of claim 17, wherein the housing is formed from a resinous material that encapsulates the capacitor element.

19. The solid electrolytic capacitor of claim 1, wherein the anode body includes tantalum.

20. The solid electrolytic capacitor of claim 1, wherein the conductive polymer particles contain a conductive polymer having repeating units of the following formula:

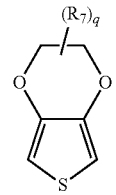

wherein,
$R_7$ is a linear or branched, $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical, or a combination thereof; and
q is an integer from 0 to 8.

21. The solid electrolytic capacitor of claim 20, wherein the conductive polymer is poly(3,4-ethylenedioxythiophene).

22. The solid electrolytic capacitor of claim 20, wherein the conductive polymer particles also contains a polymeric counterion.

23. The solid electrolytic capacitor of claim 1, further comprising an external polymer coating that overlies the solid electrolyte and contains conductive polymer particles and a cross-linking agent.

24. The solid electrolytic capacitor of claim 1, wherein the capacitor element further comprises a cathode coating that contains a metal particle layer that overlies the solid electrolyte, wherein the metal particle layer includes a plurality of conductive metal particles.

* * * * *